(12) United States Patent
Ishikawa et al.

(10) Patent No.: US 7,672,775 B2
(45) Date of Patent: Mar. 2, 2010

(54) SYSTEMS, METHODS, AND DATA STRUCTURES FOR CORRECTING TRAFFIC INFORMATION

(75) Inventors: Hiroki Ishikawa, Okazaki (JP); Tomoyuki Zaitsu, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1488 days.

(21) Appl. No.: 11/002,491

(22) Filed: Dec. 3, 2004

(65) Prior Publication Data

US 2005/0143908 A1 Jun. 30, 2005

(30) Foreign Application Priority Data

Dec. 26, 2003 (JP) ............................. 2003-434795
Sep. 22, 2004 (JP) ............................. 2004-275619

(51) Int. Cl.
 *G08G 1/00* (2006.01)
(52) U.S. Cl. ....................................... 701/119
(58) Field of Classification Search ........................ None
See application file for complete search history.

(56) References Cited

U.S. PATENT DOCUMENTS 5,912,822 A * 6/1999 Davis et al. .................. 702/143
5,982,298 A 11/1999 Lappenbusch et al.
6,810,321 B1 * 10/2004 Cook .......................... 701/117
2004/0066330 A1 4/2004 Knockeart et al.
2004/0104842 A1 6/2004 Drury et al.
2005/0143906 A1 * 6/2005 Ishikawa et al. ............. 701/200
2005/0251329 A1 * 11/2005 Ishikawa et al. ............. 701/201
2007/0038363 A1 * 2/2007 McGrath ..................... 701/117

FOREIGN PATENT DOCUMENTS

| JP | A-2002-148067 | 5/2002 |
| WO | WO 99/09374 | 2/1999 |
| WO | WO99/09374 | 2/1999 |

\* cited by examiner

*Primary Examiner*—Khoi Tran
*Assistant Examiner*—Nicholas Kiswanto
(74) *Attorney, Agent, or Firm*—Oliff & Berridge, PLC

(57) ABSTRACT

Systems, methods, and data structures for correcting traffic information data may accumulate traffic information data including, for each link, a link travel time during at least one trip time. The systems, methods, and data structures may convert the link travel time into a vehicle speed and correct the converted vehicle speed if a the vehicle speed or a first speed change amount is equal to or larger than a predetermined value.

16 Claims, 4 Drawing Sheets

SYSTEMS, METHODS, AND DATA STRUCTURES FOR CORRECTING TRAFFIC INFORMATION

INCORPORATION BY REFERENCE

The disclosure of Japanese Patent Application Nos. 2004-275619 filed on Sep. 22, 2004 and 2003-434795 filed Dec. 26, 2003 including the specifications, drawings, and abstracts are incorporated herein by reference in their entirety.

BACKGROUND

1. Related Technical Fields

Related fields include methods of correcting traffic information data, apparatus for correcting traffic information data, and traffic information data structures.

2. Description of the Related Art

Japanese Patent Application Laid-Open No. 2002-148067, discloses a navigation method including accumulating received traffic information, date and time, and day of the week, and finding a shortest route or calculating a required period with the aid of the accumulated data.

In the aforementioned navigation method, however, the received traffic information is not always correct. The information may be intermingled with abnormal data such as a link travel times having unexpected values. Furthermore, utilization of such accumulated data, including the abnormal data, causes inconvenience, such as, a decrease in the reliability of route search.

SUMMARY

Thus, it is beneficial to provide a method of correcting traffic information, an apparatus for correcting traffic information, and a traffic information data structure that may correct for example, a seemingly abnormal link travel time and/or abnormal vehicle speeds.

Accordingly, various exemplary implementations provide a method of correcting traffic information including accumulating traffic information including, for each link, a link travel time during at least one trip time and converting the link travel time into a vehicle speed. The method includes calculating, as a first speed change amount, a difference between the converted vehicle speed and a vehicle speed that precedes the converted vehicle speed by, for example, a predetermined time period and comparing the first speed change amount to a predetermined value. The converted vehicle speed is corrected if the first speed change amount is equal to or larger than the predetermined value.

Various exemplary implementations provide a method of correcting traffic information including accumulating traffic information including, for each link, a link travel time during at least one trip time and converting the link travel time into a vehicle speed. The method includes determining that the converted speed is abnormal if the converted vehicle speed is larger than a predetermined value and replacing the abnormal vehicle speed with the predetermined value.

Various exemplary implementations provide a system for correcting traffic information that may include a memory that accumulates traffic information including, for each link, a link travel time during at least one trip time and a controller. The controller may convert the link travel time into a vehicle speed, calculate, as a first speed change amount, a difference between the converted vehicle speed and a vehicle speed that precedes the converted vehicle speed by, for example, a predetermined time period, compare the first speed change amount to a predetermined value; and correct the converted vehicle speed if the first speed change amount is equal to or larger than the predetermined value.

Various exemplary implementations provide a traffic information data structure including accumulated traffic information including, for each link, a link travel time and a vehicle speed during at least one trip time, the vehicle speeds being obtained by converting link travel times for each link. The data may be produced by correcting at least one vehicle speed, the at least one vehicle speed to be corrected having a difference from a vehicle speed that precedes the converted vehicle speed by, for example, a predetermined time period, the difference being greater than a predetermined value.

Various exemplary implementations provide a traffic information data structure including accumulated traffic information including, for each link, a link travel time and a vehicle speed during at least one trip time, the vehicle speeds being obtained by converting link travel times for each link. The data may be produced by correcting at least one vehicle speed, the at least one vehicle speed to be corrected being greater than a predetermined value.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
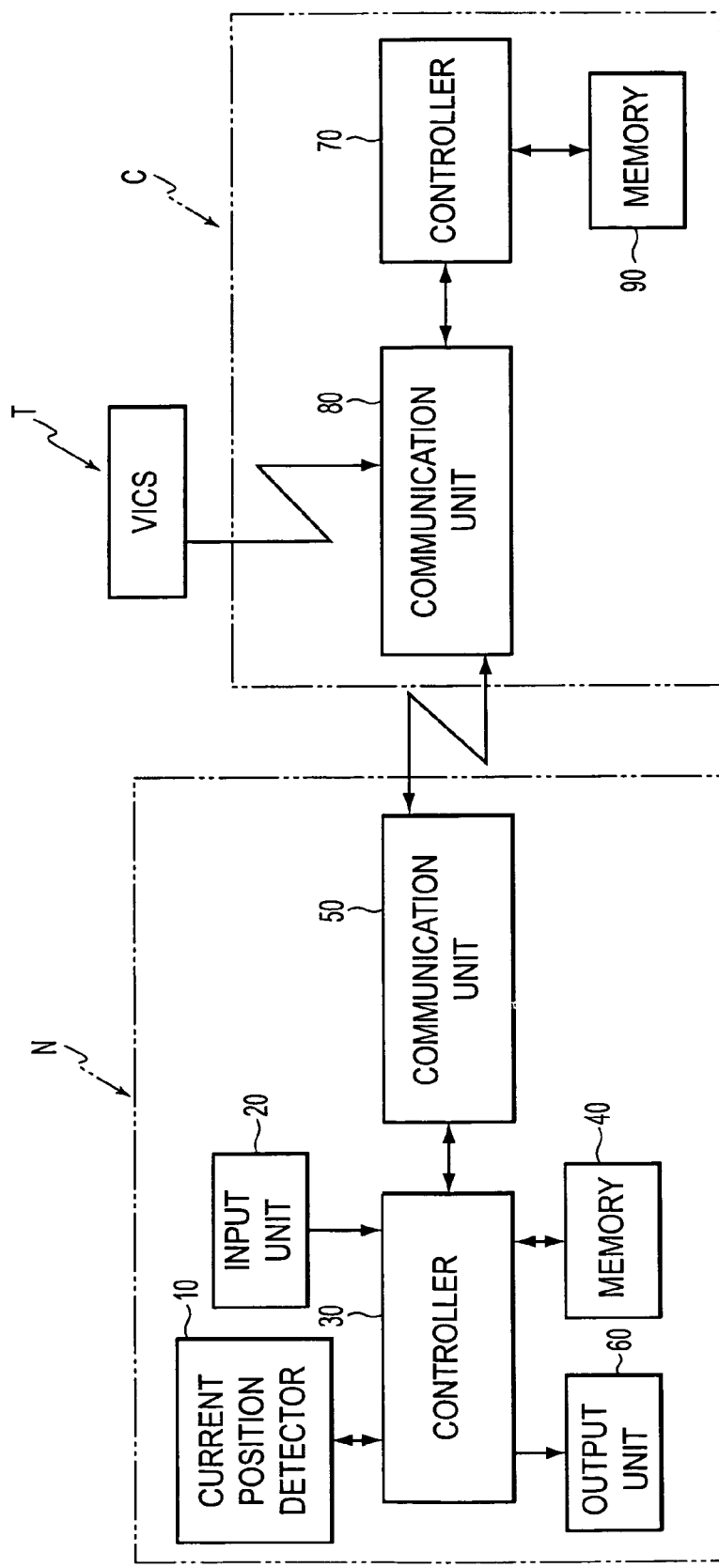
FIG. 1 is a block diagram showing an exemplary traffic information correction system.

FIG. 1 is a block diagram showing an exemplary traffic information correction system. This system may be physically, conceptually, or functionally divided into, for example, a navigation apparatus N and an information communication system C, for example, provided in an information center. The navigation system N may be mounted in a vehicle. Further, FIG. 1 shows a road traffic information communication system T (hereinafter also referred to as VICS®) that may be provided in a road traffic information center.

The navigation system N may be provided with a current position detector 10 (such as, for example, a GPS receiver). The current position detector 10 may receive radio waves sent from an artificial satellite of a satellite navigation system (also known as GPS) to detect a current position of a vehicle as well as a present day and time.

In addition, the navigation system N may be provided with an input unit 20. The input unit 20 may be, for example, a portable remote controller that may send required information to a controller 30 (described later). The input unit 20 may also be, for example, a touch panel provided on a display screen of a display device. Such a display device may be part of an output unit 60 (described later).

Furthermore, the navigation system N may be provided with, for example, a controller 30, a memory 40, a communication unit 50, and/or an output unit 60. The controller 30 may include, for example, a CPU, a RAM, and/or a ROM and may be connected by, for example, bus lines.

The controller 30 may control, for example, map display, route search, and/or route guidance of the vehicle based upon, for example, a current position that is obtained by, for example, the current position detector 10, operation of the input unit 20, information in the memory 40, communication from communication unit 50, and/or information from the information communication system C.

The memory 40 may be, for example, a hard disk. Map data and/or traffic information data may be accumulated in the memory 40, for example, in a database or other data structure. The communication unit 50 may receive, for example, road traffic information from the information communication system C to output to the controller 30.

The information communication system C may include, for example, a controller 70, a communication unit 80, and/or the memory 90. The communication unit 80 may execute wireless communication between the communication unit 50 and VICS T. The controller 70 may execute, for example, the exemplary methods shown in the flowcharts in FIGS. 2 to 6. The controller 70 may also control the transfer of information between, for example, the communication unit 50 and VICS T via, for example, the communication unit 80. Note that, control programs may be stored in advance in, for example, a ROM of the controller 70.

Link travel times TT, vehicle speeds, congestion degrees D, and/or traffic information data (such as, for example, roads closed to traffic and traffic regulations) may be sent from VICS T and stored in the memory 90, for example, in a database or other data structure. A congestion degree D is a degree of traffic congestion determined by a vehicle speed and the congestion degree may include four-stage data, that is, for example, "congested," "crowded," "not congested," and "uncertain." According to this example, the degree of congestion decreases in the order of "congested," "crowded," and "not congested." The congestion degree is not limited to four stages and may include a plurality of stages.

Further, a VICS link length may be stored in the memory 90 as map data. The VICS link length is an actual length of a target link.

As used herein, the term link refers to, for example, a road or portion of a road. For example, according to one type of road data, each road may include a plurality of componential units called links. Each link may be separated and defined by, for example, an intersection, an intersection having more than three roads, a curve, and/or a point at which the road type changes. A link travel time TT is the amount of time necessary to travel a particular link.

The output unit 60 may be, for example, a display unit. Under the control of the controller 30, the output unit 60 may display data A display panel, such as, for example, a liquid crystal panel of the output unit 60 may be disposed in an instrument panel that is provided in a front wall in a cabin of the vehicle.

Figure 2:
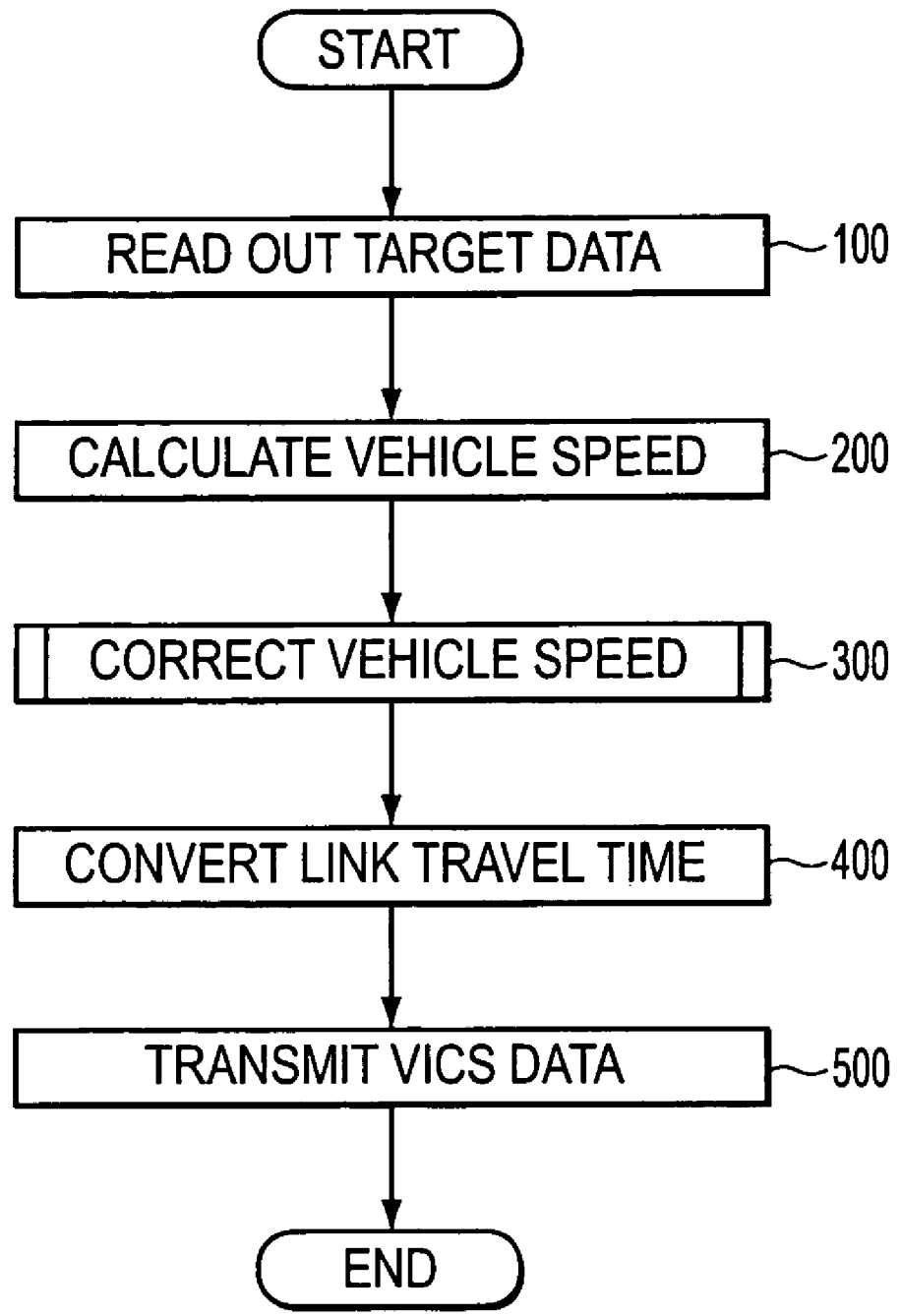
FIG. 2 is a flowchart showing an exemplary method of correcting traffic information.

The information communication system C may correct link travel times TT stored in, for example, the memory 90 by, for example the exemplary method shown in FIG. 2.

First, in step 100, target data is read out from, for example, the memory 90. Accordingly, for example, a link travel time TT (time required to travel across the link), a trip time (time at which traveling will take place), and a link length L may be read out from the memory 90 for each link.

In step 200, a vehicle speed V corresponding to the link travel time TT at each trip time for each link and the link length L at each trip time for each link is calculated according to equation 1.

$$V = K'L/TT \tag{1}$$

In this equation, a road correction coefficient K corrects for different road types. For instance, the road correction coefficient K may 0.8 in the case of a national road, 1.0 in the case of a prefectural road, and 1.5 in the case of a minor street. In step 300, the vehicle speed, for each link at each trip time, may be corrected according to for example the exemplary routine of FIG. 3.

Figure 3:
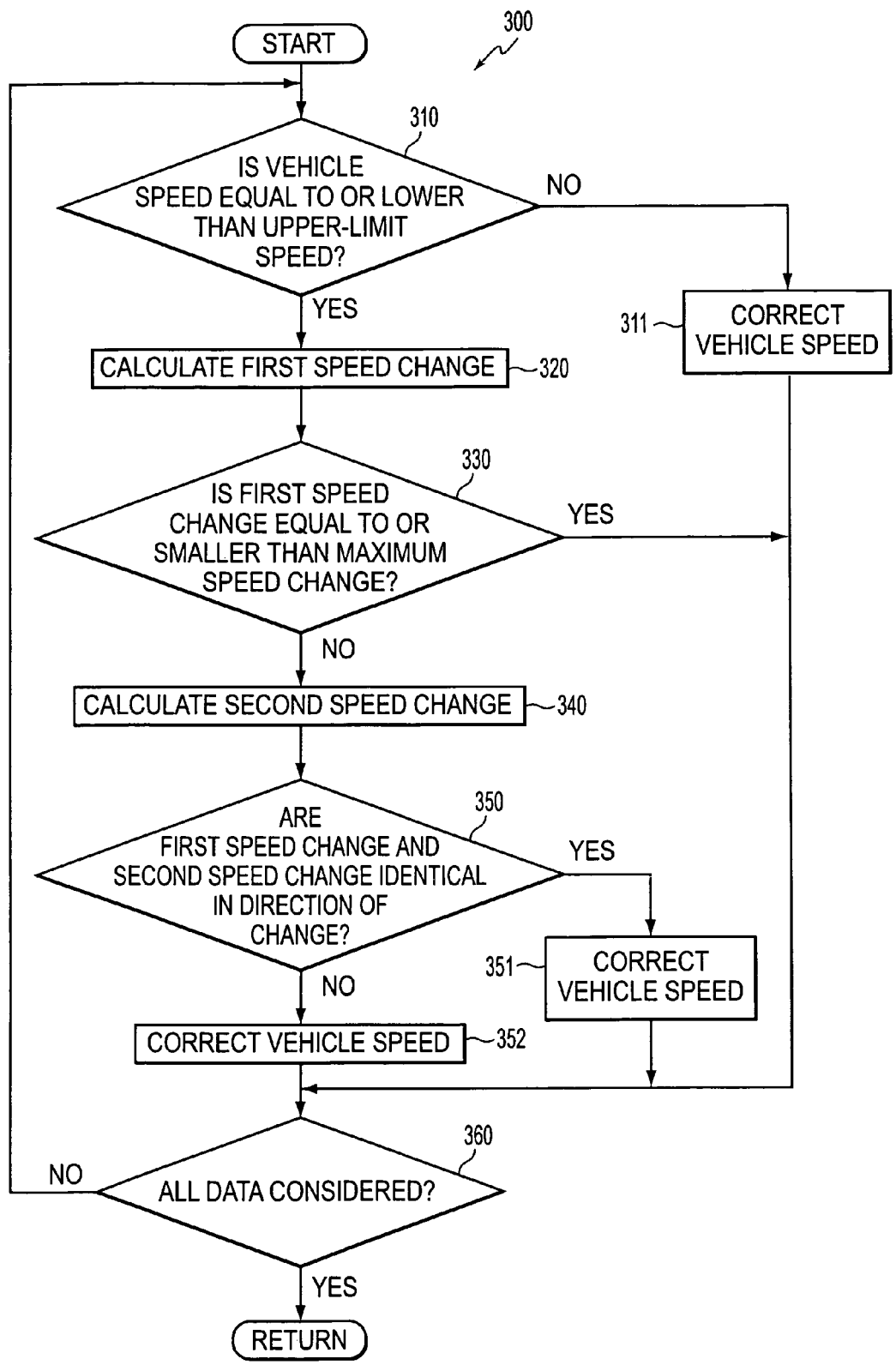
FIG. 3 is a flowchart showing an exemplary method of correcting vehicle speed information.

In step 310 of FIG. 3, it is determined whether the vehicle speed V is equal to or lower than an upper-limit speed Vmax. The upper-limit speed Vmax may differ depending on the road type (such as, for example, a general road, an intercity highway, and/or an expressway). For example, the upper-limit speed Vmax may be set equal to 80 km/h on the general road, 100 km/h on the intercity highway, and 120 km/h on the expressway. If the vehicle speed V=90 km/h on the general road, it follows that the vehicle speed V is not equal to or lower than the upper-limit speed Vmax. If the vehicle speed V is not equal to or lower than the upper-limit speed Vmax, operation continues to step 311.

In step 311, the vehicle speed is corrected. Specfically, the vehicle speed V is replaced with the corresponding upper-limit speed Vmax. For example, in the case where the vehicle speed V=90 km/h on the general road, since the upper-limit speed Vmax=80 km/h, the vehicle speed V is replaced with 80 km/h. The operation then proceeds to step 360.

If, in step 310, the vehicle speed V is equal to or lower than the upper-limit speed Vmax, operation continues to step 320. In step 320, a first speed change amount is calculated. Specifically, a first speed change amount DV1 is calculated according to equation 2.

$$DV1 = V - Vb \tag{2}$$

In equation 2, a vehicle speed Vb represents a vehicle speed at a predetermined time prior to the vehicle speed V. Operation continues to step 330.

In step 330, it is determined whether the absolute value of the first speed change amount DV1 is equal to or smaller than a maximum change amount DVmax. The maximum change amount DVmax may differ depending on the road type. For example, the maximum change amount DVmax may be set equal to 15 km/h on a general road, 20 km/h on an intercity highway, and 25 km/h on an expressway. If the first speed change amount=10 km/h on the general road, the absolute value of the first speed change amount DV1 is equal to or smaller than the maximum change amount DVmax. If the absolute value of the first speed change amount DV1 is equal to or smaller than the maximum change amount DVmax operation continues to step 360.

If the absolute value of the first speed change amount DV1 is greater than the maximum change amount DVmax in step 330, operation continues to step 340. In step 340, a second speed change amount is calculated according to an equation 3.

$$DV2 = Va - V \tag{3}$$

In equation 3, a vehicle speed Va represents a vehicle speed at a predetermined time after vehicle speed V. Operation continues to step 350.

Figure 4:
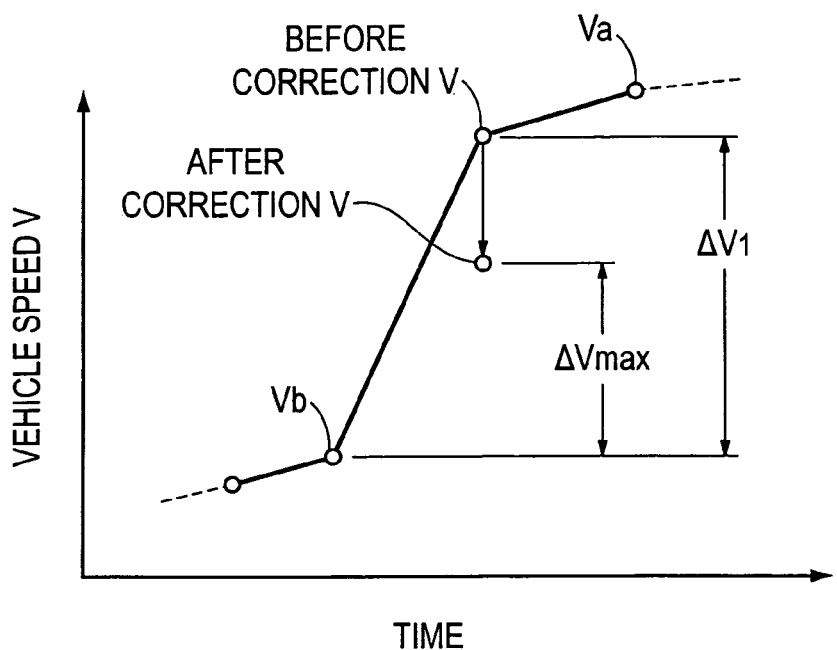
FIG. 4 is a flowchart showing an exemplary method of correcting vehicle speed information.
Figure 5:
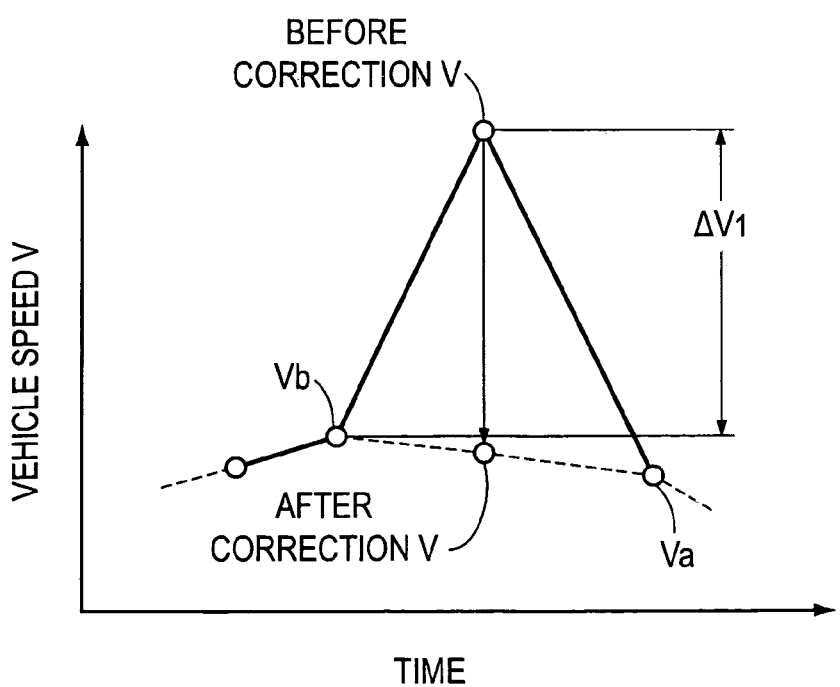
FIG. 5 is a flowchart showing an exemplary method of correcting vehicle speed information.

In step 350, it is determined whether the above-mentioned first speed change DV1 and the above-mentioned second speed change DV2 are identical in direction of change (i.e., both speeding up or both slowing down). If the first speed change DV1 and the second speed change DV2 are identical in direction of change, operation continues to step 351. In step 351, the vehicle speed is corrected. Specifically, the vehicle speed V is corrected such that the difference from the vehicle speed Vb becomes equal to the maximum change amount DVmax as shown in FIG. 4.

For example, if the vehicle speed V=50 km/h, the vehicle speed Vb (the predetermined time period before)=30 km/h, and the vehicle speed Va (the predetermined time period after)=55 km/h, on a general road, the maximum change amount DVmax=15 km/h, then the first speed change amount DV1=50−30=20 km/h, and that the second speed change amount DV2=55−50=5 km/h. Accordingly, since the first speed change amount DV1 and the second speed change amount DV2 are identical in change of direction, the vehicle speed V is replaced with Vb+DVmax=30+15=45 km/h.

If, in step 350, the first speed change amount DV1 and the second speed change amount DV2 are not identical in direction of change, operation continues to step 352. In step 352, the vehicle speed is corrected. Specifically, the vehicle speed V is corrected to an average of the vehicle speed Vb and the vehicle speed Va.

For instance, if the vehicle speed V=50 km/h, the vehicle speed Vb=30 km/h, and the vehicle speed Va=20 km/h, on a general road, the maximum change amount DVmax=15 km/h, the first speed change amount DV1=50−30=20 km/h, and that the second speed change DV2=20−50=−30 km/h. Accordingly, since the first speed change DV1 and the second speed change DV2 are not identical in direction of change, the vehicle speed V is replaced with (Vb+Va)/2=(30+20)/2=25 km/h. Operation continues to step 360.

In step 360, it is determined whether the vehicle speed correction processing of all the VICS data within a predetermined period (e.g., a period necessary for a route search) has been reviewed. If the vehicle speeds of all the VICS data within the predetermined period have not been reviewed, operation returns to step 310 where an other vehicle speed is considered (e.g., for a different link and/or trip time). If the vehicle speeds of all the VICS data within the target period have been reviewed, operation ends.

Returning to FIG. 2, operation then continues to step 400. In step 400, a link travel time is converted. Specifically, the link travel time TT is calculated according to equation 4, based on the corrected vehicle speeds.

$$TT = K'L/V \quad (4)$$

Once all of the vehicle corrected vehicle speeds are converted back to travel times TT, operation continues to step 500. In step 500, the corrected VICS data may be transmitted. For example, the communication unit 80 may transmit the corrected VICS data to the controller 30 via the communication unit 50. The received corrected VICS data may thus be accumulated in the memory 40.

According to the above-described exemplary method, the link travel time TT may be converted into the vehicle speed V. Any unexpected value of the vehicle speed V obtained as a result of the conversion may be corrected by using the upper-limit speed Vmax, the maximum change amount DVmax, the first speed change amount DV1 and the second speed change amount DV2. After the vehicle speed V is corrected, the corrected vehicle speed V is converted back into the link travel time TT. Therefore, a conspicuous or incorrect link travel time may be corrected, and the reliability of the VICS data can be enhanced. Further, since the vehicle speed V is correctively processed according to realistic indexes such as the upper-limit speed Vmax and the maximum change amount DVmax which are based on the road type, more realistic data can be produced.

As a result, the controller 30 may search for a route on the basis of, for example, a display request made by the input unit 20. The controller 30 may conduct a route on the basis of the corrected, and thus more reliable, VICS data that are accumulated in the data base of the memory 40. Accordingly, the navigation system N can provide precise route guidance.

It should be appreciated that the above-described exemplary system and method are not limiting, various modifications may be made without departing from the broad scope and spirit of the underlying principles.

For example, it should be appreciated that the vehicle speed Vb may be defined based on any predetermined time period, ranging from, for example, less than a second to a plurality of months.

Similarly it should be appreciated that the vehicle speed Va may be defined based on any predetermined time period, ranging from, for example, less than a second to a plurality of months.

The vehicle speed V may be corrected not only to the average of the vehicle speed Vb and the vehicle speed Va, the vehicle speed V may be corrected to, for example, the average of a plurality of vehicle speeds before and after a corresponding time.

As described above, if a vehicle speed V is above an upper-limit speed Vmax, the vehicle speed V may be set equal to the upper-limit speed Vmax. However, there may be, for example, a lower-limit speed Vmin, and if the vehicle speed V is lower than the lower-limit speed Vmin, it may be set equal thereto.

As described above, the communication information system C may receive the VICS data from the vehicle information center, may perform any one or more of the exemplary methods described above, and may transmit the data to the navigation system N. However, the navigation system N may receive all or some of the VICS data directly from the vehicle information center and may perform the one or more of the above described exemplary methods.

Again, while various features of this invention have been described in conjunction with the examples outlined above, various alternatives, modifications, variations, and/or improvements of those features may be possible. Accordingly, the various examples, as set forth above, are intended to be illustrative. Various changes may be made without departing from the broad spirit and scope of underling principles.

What is claimed is:

1. A method of correcting traffic information, comprising:
   accumulating traffic information including, for each link, a link travel time and a trip time at which traveling will take place;
   converting the link travel time into a vehicle speed;
   calculating, as a first speed change amount, a difference between a first converted vehicle speed and a second converted vehicle speed at a predetermined time prior to the first converted vehicle speed;
   comparing an absolute value of the first speed change amount to a predetermined value;
   correcting the first converted vehicle speed if the absolute value of the first speed change amount is equal to or larger than the predetermined value; and
   converting a corrected first converted vehicle speed into a corrected link travel time;
   wherein the traffic information is accumulated in a memory in the accumulating step and the remaining steps are executed by a controller.

2. The method of claim 1, further comprising:
   calculating, as a second speed change amount, a difference between the first converted vehicle speed and a third converted vehicle speed at a predetermined time subsequent to the first converted vehicle speed;
   comparing the absolute value of the first speed change amount to an absolute value of the second speed change amount; and correcting the first converted vehicle speed based on the absolute value of the first speed change amount and the absolute value of the second speed change amount.

3. The method of claim 2, wherein, if the first speed change amount and the second speed change amount are identical in direction of change, the method further comprises:
   correcting the first converted vehicle speed to a value obtained by adding the predetermined value to the second vehicle speed at the predetermined time prior to the first converted vehicle speed.

4. The method of claim 2, wherein, if the first speed change amount and the second speed change amount are not identical in direction of change, the method further comprises:
   correcting the first converted vehicle speed as an arithmetic mean of at least two vehicle speeds that precede or follow the first converted vehicle speed.

5. The method of claim 1, further comprising:
   correcting the first converted vehicle speed to a value obtained by adding the predetermined value to the second vehicle speed at the predetermined time prior to the first converted vehicle speed.

6. The method of claim 1, further comprising:
   correcting the first converted vehicle speed as an arithmetic mean of at least two vehicle speeds that precede or follow the first converted vehicle speed.

7. A computer-readable storage medium storing a set of computer-readable program instructions executable on a data processing device and usable to correct traffic information, the program comprising:
   instructions for accumulating traffic information including, for each link, a link travel time and a trip time at which traveling will take place;
   instructions for converting the link travel time into a vehicle speed;
   instructions for calculating, as a first speed change amount, a difference between a first converted vehicle speed and a second converted vehicle speed at a predetermined time prior to the first converted vehicle speed;
   instructions for comparing an absolute value of the first speed change amount to a predetermined value;
   instructions for correcting the first converted vehicle speed if the absolute value of the first speed change amount is equal to or larger than the predetermined value; and
   instructions for converting a corrected first converted vehicle speed into a corrected link travel time.

8. A method of correcting traffic information, comprising:
   accumulating traffic information including, for each link, a link travel time and a trip time at which traveling will take place;
   converting the link travel time into a vehicle speed;
   determining that the vehicle speed is abnormal if the vehicle speed is larger than a predetermined value;
   replacing an abnormal vehicle speed with the predetermined value; and
   converting a replaced vehicle speed into a corrected link travel time;
   wherein the traffic information is accumulated in a memory in the accumulating step and the remaining steps are executed by a controller.

9. The method of claim 8, wherein the predetermined value is related to a road type.

10. A computer-readable storage medium storing a set of computer-readable program instructions executable on a data processing device and usable to correct traffic information, the program comprising:
    instructions for accumulating traffic information including, for each link, a link travel time and a trip time at which traveling will take place;
    instructions for converting the link travel time into a vehicle speed;
    instructions for determining that the vehicle speed is abnormal if the vehicle speed is larger than a predetermined value;
    instructions for replacing an abnormal vehicle speed with the predetermined value; and
    instructions for converting a replaced vehicle speed into a corrected link travel time.

11. A system for correcting traffic information, comprising:
    a memory that accumulates traffic information including, for each link, a link travel time and a trip time at which traveling will take place; and
    a controller that:
      converts the link travel time into a vehicle speed;
      calculates, as a first speed change amount, a difference between a first converted vehicle speed and a second converted vehicle speed at a predetermined time prior to the first converted vehicle speed;
      compares an absolute value of the first speed change amount to a predetermined value;
      corrects the first converted vehicle speed if the absolute value of the first speed change amount is equal to or larger than the predetermined value; and
      converts a corrected first converted vehicle speed into a corrected link travel time.

12. The system of claim 11, wherein the controller:
    calculates, as a second speed change amount, a difference between the first converted vehicle speed and a third converted vehicle speed at a predetermined time subsequent to the first converted vehicle speed;
    compares the absolute value of the first speed change amount to an absolute value of the second speed change amount; and
    corrects the first converted vehicle speed based on the absolute value of the first speed change amount and the absolute value of the second speed change amount.

13. The system of claim 12, wherein, if the first speed change amount and the second speed change amount are identical in direction of change, the controller:
    corrects the first converted vehicle speed to a value obtained by adding the predetermined value to the second vehicle speed at the predetermined time prior to the first converted vehicle speed.

14. The system of claim 12, wherein, if the first speed change amount and the second speed change amount are not identical in direction of change, the controller:
    corrects the first converted vehicle speed as an arithmetic mean of at least two vehicle speeds that precede or follow the first converted vehicle speed.

15. The system of claim 11, wherein the controller:
    corrects the first converted vehicle speed to a value obtained by adding the predetermined value to the second vehicle speed at the predetermined time prior to the first converted vehicle speed.

16. The system of claim 11, wherein the controller:
    corrects the first converted vehicle speed as an arithmetic mean of at least two vehicle speeds that precede or follow the first converted vehicle speed.

* * * * *